US005406464A

United States Patent [19]

Saito

[11] Patent Number: 5,406,464

[45] Date of Patent: Apr. 11, 1995

[54] REFLECTOR FOR VEHICULAR HEADLAMP

[75] Inventor: Norikazu Saito, Shizuoka, Japan

[73] Assignee: Koito Manufacturing Co., Ltd., Tokyo, Japan

[21] Appl. No.: 151,106

[22] Filed: Nov. 12, 1993

[30] Foreign Application Priority Data

Dec. 25, 1992 [JP] Japan .................................. 4-358025

[51] Int. Cl.[6] .............................................. B60Q 1/04

[52] U.S. Cl. ..................................... 362/61; 362/346; 362/304; 362/215; 362/297; 362/348

[58] Field of Search ................. 362/61, 346, 215, 304, 362/348, 297

[56] References Cited

U.S. PATENT DOCUMENTS

| | | | |
|---|---|---|---|
| 3,700,883 | 10/1972 | Donohue et al. | 362/297 |
| 4,208,704 | 6/1990 | Draper | 362/61 |
| 4,704,661 | 11/1987 | Kosmatka | 362/61 |
| 4,779,179 | 10/1988 | Oyama et al. | 362/346 |
| 5,067,053 | 11/1991 | Akizuki | 362/61 |
| 5,171,082 | 12/1992 | Watanabe | 362/61 |

FOREIGN PATENT DOCUMENTS

| | | |
|---|---|---|
| 2915389 | 10/1980 | Germany . |
| 2947172 | 5/1981 | Germany . |

*Primary Examiner*—Ira S. Lazarus
*Assistant Examiner*—Thomas M. Sember
*Attorney, Agent, or Firm*—Sughrue, Mion, Zinn, Macpeak & Seas

[57] ABSTRACT

A reflector for a vehicular headlamp in which glare formed by light reflected from a stepped part at the boundary of the adjacent segments constituting a reflector is reduced. Of the distribution control segmental areas on the reflecting surface, a first reflecting area consisting of an aggregation of hyperbolic paraboloid segments forms a pattern widely diffused in the horizontal direction. Second reflecting areas each consisting of elliptic paraboloid segments form a pattern contributing to the formation of the luminous-intensity center of a distribution pattern. A third reflecting area consisting of an aggregation of paraboloid-of-revolution segments forms a pattern contributing to the formation of a cut line tilted a given angle with respect to the horizontal line in the distribution pattern of a passing beam. The focal distance of the reference surface for the paraboloid-of-revolution surface changes for each segment. The focal distance becomes smaller the higher the segment location is on the reflecting surface, and the farther the distance of the reflecting segment from the vertical plane including the optical axis the greater the focal distance.

6 Claims, 7 Drawing Sheets

REFLECTOR FOR VEHICULAR HEADLAMP

BACKGROUND OF THE INVENTION

The present invention relates to reflector for vehicular headlamps, the reference surface for which is a paraboloid of revolution and the reflecting surface of which is made up of a plural number of reflecting areas, each composed of an aggregation of reflecting segments of one of three basic configurations, a hyperbolic paraboloid, an elliptic paraboloid, or a two-sheet hyperbolic paraboloid or paraboloid of revolution, wherein the focal distance of the paraboloid-of-revolution reference surface is locally varied, not fixed, and wherein the light reflected at the boundaries between adjacent reflecting segments contributes in a positive manner to the formation of the output light distribution.

In a headlamp for a motor vehicle, in a basic construction for forming a passing beam, a coiled filament is disposed near the focal point of a reflector having the shape of a paraboloid of revolution with the center axis of the filament lying along the optical axis of the reflector, (called the filament layout of the C8 type), and a shade forming a cut line in the output light distribution pattern is disposed below the filament.

To form a desired light pattern image by the reflector, the light distribution is controlled by a lens step area on an outer lens that is disposed in front of the reflector. The resultant light distribution pattern is thus made to conform to the applicable standards.

Desired aerodynamic characteristics of the vehicle, body design, and the like frequently require the vehicle body to be shaped in a streamlined fashion. Thus, the front of the car body is often made narrow, and the headlamps must be designed in conformity with a so-called slant nose shape. In a conventional headlamp, to form a light distribution pattern having a cut line suitable for the formation of a passing beam, the lens step area of the outer lens must play a key role in light distribution control. This has the effect of limiting an increase of the angle of inclination of the outer lens with respect to the vertical axis of the vehicle. Accordingly, the conventional headlamp cannot easily be adapted for a slant nose design.

A reflector has been proposed in which a paraboloid-of-revolution surface is used as a reference surface, and a number of reflecting segments are laid out on the paraboloid-of-revolution surface. The basic configuration of each segment is a hyperbolic paraboloid, an elliptic paraboloid, or a two-sheet hyperbolic paraboloid.

The reflecting surface is divided into several reflecting area having light distribution control functions. The configurations of the reflecting segments are determined for each reflecting area in consideration of desired diffusion and converging characteristics. The projection patterns formed by the reflecting surfaces are composed into a pattern resembling a prescribed pattern. The proposed reflector thus constructed succeeds in lessening the dependency of the light distribution control on the lens step part of the outer lens.

To form the above-mentioned reflector, a reference surface is defined, which is a paraboloid-of-revolution surface of a fixed focal distance. The reflecting segments are laid out on the paraboloid-of-revolution surface in a state such that the segments contact one another at certain points on that surface. However, stepped parts are formed at the boundaries of the segments, which results in glare and hinders light distribution control.

FIG. 11(*a*) is a vertical sectional view schematically showing a reflecting surface a. When the focal distances for two segments b adjacent to each other in the vertical direction are equal and the focal positions thereof are the same, a horizontally extending stepped part c is unavoidably obliquely formed. Accordingly, reflected light d is directed upward, causing remarkable glare. In the figure, the x-axis is the optical axis, and the z-axis is the vertical axis.

FIG. 11(*b*) is a horizontal sectional view schematically showing the reflecting surface a. When the reference surfaces of segments e adjacent to each other in the horizontal direction have equal focal distances and focal positions, a vertically extending stepped portion f is formed directed toward the optical axis. The reflected light g at the stepped part f is light g directed toward the inner side of the reflecting surface. The light g cannot be controlled. In the figure, the y-axis is a horizontal axis.

If a paraboloid-of-revolution surface having a fixed focal distance is used as the reference surface, the vertical width of the reflector is determined by the focal distance, so that the freedom in selecting the width of the reflecting surface is limited. Thus, the conventional technique fails to meet the requirement of narrowing the overall width of the lamp.

SUMMARY OF THE INVENTION

To solve the above problems, in accordance with the invention, a reflector for a vehicular headlamp is provided in which each of plural reflecting areas forming the reflecting surface is composed of an aggregation of reflecting segments, and each reflecting segment of each of the reflecting areas has a configuration of one of a hyperbolic paraboloid, an elliptic paraboloid, or a two-sheet hyperbolic paraboloid or paraboloid of revolution. These segments are laid out on a reference surface, thereby forming the completed reflecting surface.

The reference surface is a paraboloid-of-revolution surface. The focal distance of the reference surface is different for the various reflecting segments such that the higher the location of the reflecting segment on the reference surface, the smaller the focal distance of the reference surface, and the further the reflecting segment from a vertical plane including the optical axis in the horizontal direction, the greater the focal distance.

To form a reflecting area exhibiting good diffusion in the horizontal direction, hyperbolic paraboloid reflecting segments are used. To provide a reflecting area contributing to the formation of a central part of the light distribution pattern, elliptic paraboloid reflecting segments are employed. Further, to provide a reflecting area contributing to the formation of a cut line tapered with respect to the horizontal line to form a passing light beam, two-sheet hyperbolic paraboloid or paraboloid of revolution reflecting segments are used.

As mentioned above, the higher the location of a reflecting segment, the smaller the focal distance of the reference surface. Accordingly, stepped parts formed at the boundaries between adjacent reflecting segments as viewed in the vertical direction face downward, and thus light reflected at such stepped parts is directed downward. As a result, glare is minimized. As further mentioned above, the farther a reflecting segment from the vertical plane including the optical axis in the horizontal direction, the greater the focal distance. Stepped parts between adjacent reflecting segments as viewed in the horizontal direction are located in a dead zone when viewed from the light source which is not illuminated with direct light rays.

Since the focal distances of the reference surface are locally different, the focal distance does not uniquely determine the width of the reflector. Accordingly, the solid angle when the reflecting surface is seen from the filament may be increased.

DESCRIPTION OF THE PREFERRED EMBODIMENTS

A reflector for a vehicular headlamp constructed according to a preferred embodiment of the present invention will be described with reference to the accompanying drawings. In the embodiment to be described, the invention is applied to a reflector substantially circular when viewed from the front, although the invention is no so limited.

Figure 1:
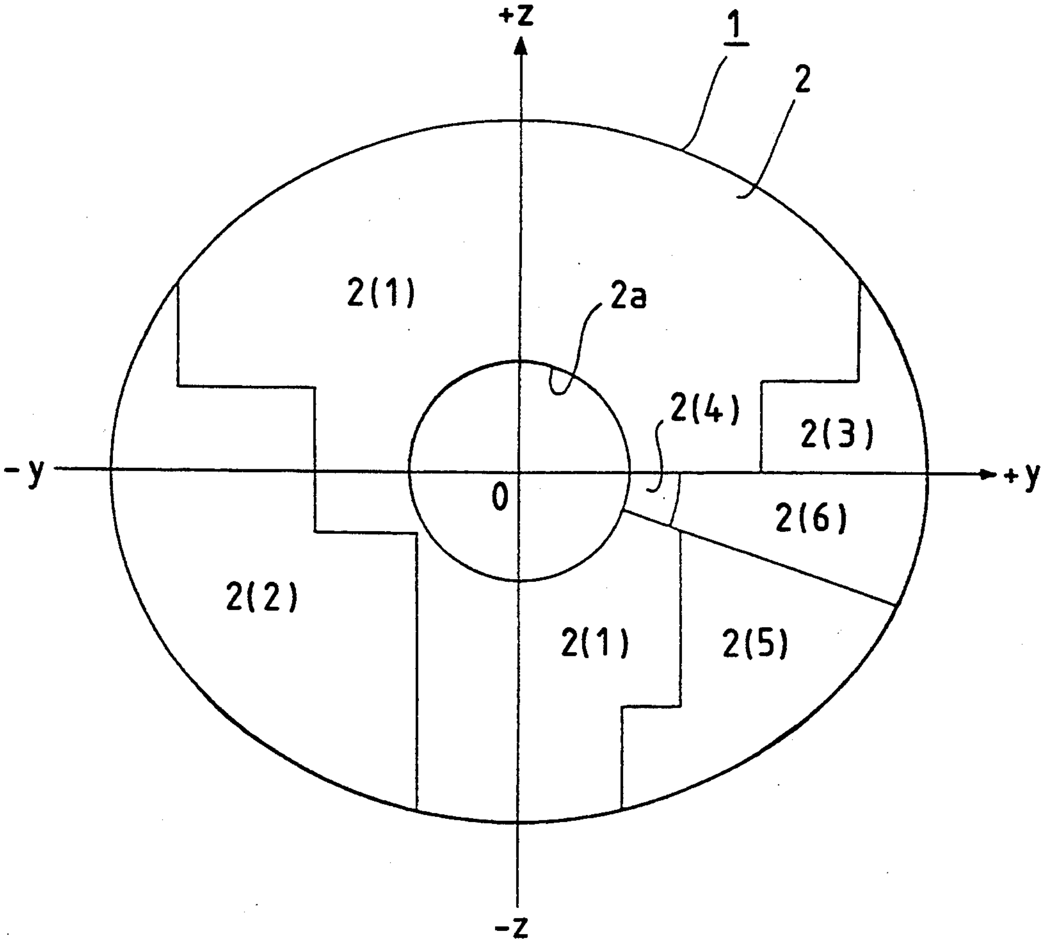
FIG. 1 is a front view schematically showing a reflector according to the present invention, the illustration being used in explaining light distribution control areas on the reflector.

FIG. 1 is a front view schematically showing a reflector according to the present invention, the illustration being useful in explaining light distribution control areas on the reflector 1. The reflecting surface 2 is made up of six reflecting areas (denoted generally by 2(i), where i is any of 1 to 6, and is used for identifying those reflecting areas).

In the coordinate system of the reflector 1, the x-axis is perpendicular to the surface of the paper of the drawing. The y-axis is perpendicular to the x-axis and extends horizontally on the paper surface. The z-axis is perpendicular to both the x- and y-axes, and extends vertically on the paper surface. A circular hole 2*a* for mounting the bulb (light source) is formed in the central portion of the reflecting surface 2, centered at the origin O of the orthogonal coordinates.

Figure 2:
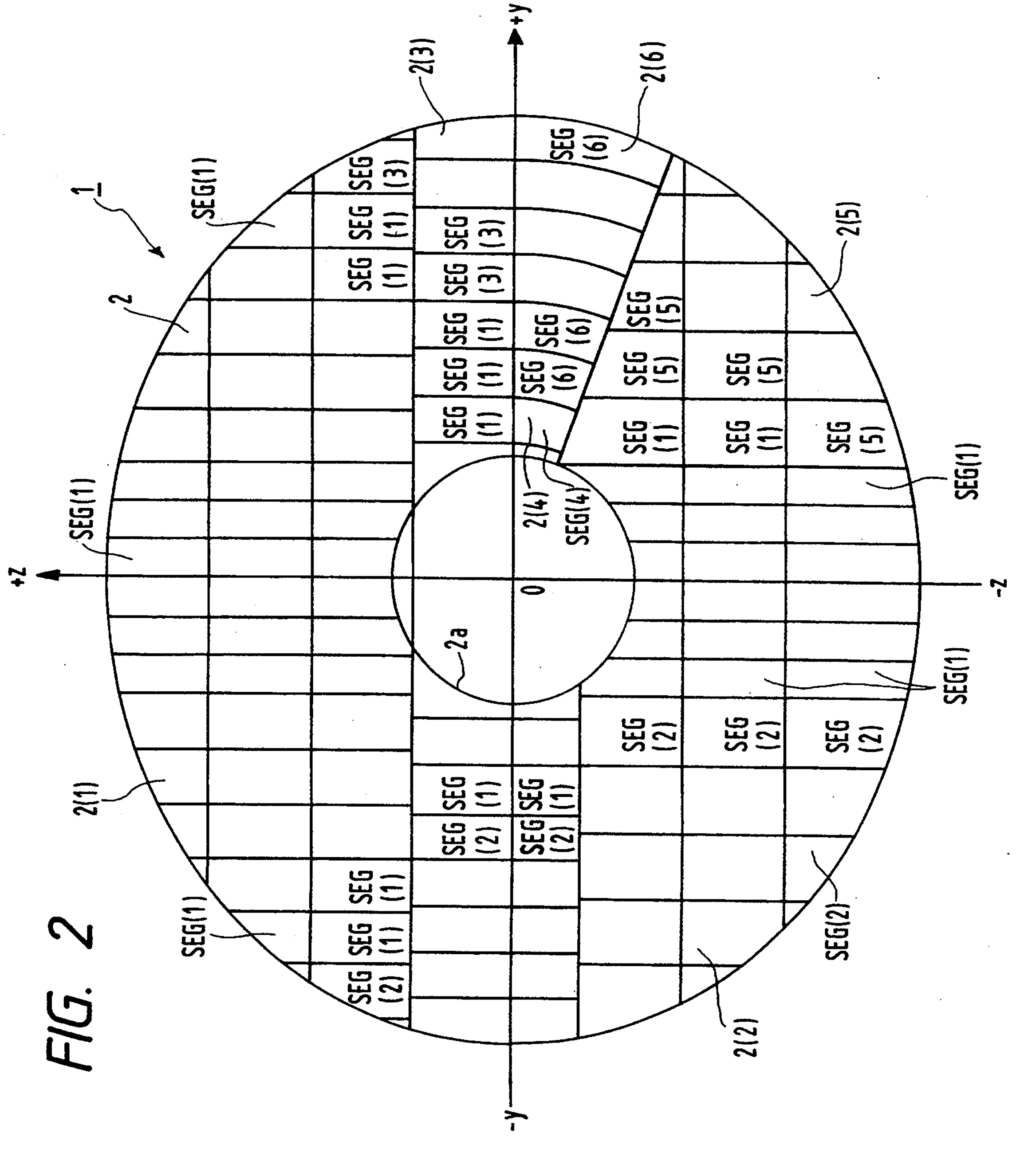
FIG. 2 is a front view schematically showing the reflector according to the present invention.

As shown in FIG. 2, each reflecting area 2(*i*) (i=1 to 6) consists of a plural number of segments 2(*j*) (j=1 to 6, and denoted as SEG (i)). Each segment has a basic curved surface (hyperbolic paraboloid, elliptic paraboloid, or paraboloid-of-revolution). These segments are laid out on a paraboloid-of-revolution reference surface having locally different focal distances, thereby forming the reflecting surface 2.

The reflecting areas 2(1) above and below the circular hole 2*a* occupies large areas in the first and second quadrants of the y-z plane, and areas closer to the z-axis in the third and fourth quadrants.

The segments from the top to third rows in the reflecting area 2(1) in the y-z plane are laid out symmetrically with respect to the x-z plane. The segments which are in the lower part in the y-z plane are asymmetrical with respect to the x-z plane.

The segments forming the reflecting area 2(1) have hyperbolic paraboloid surfaces. When the reflecting area is seen from the front, it looks like a lattice.

Figure 4:
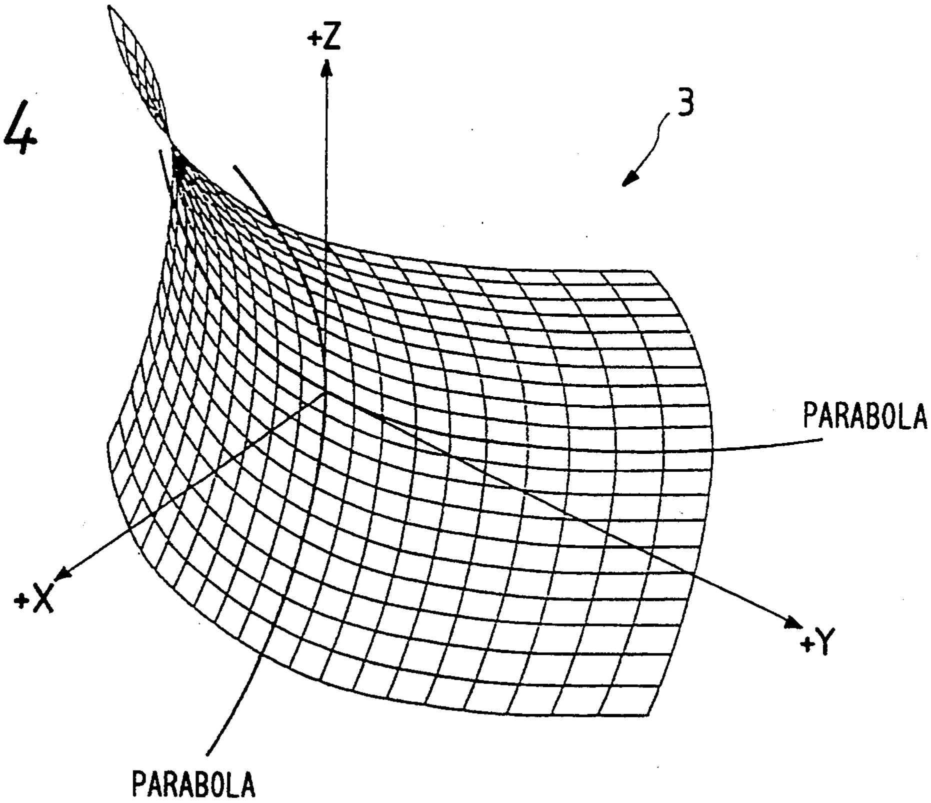
FIG. 4 is a perspective view showing a hyperbolic paraboloid surface.

FIG. 4 shows a hyperbolic paraboloid plane or surface 3 as a basic configuration of the segment. In the coordinate system of the plane, the X-axis is the axis extending in the normal direction at the origin. The Y-axis is the horizontally extending axis, and the Z-axis is the vertically extending axis.

The hyperbolic paraboloid plane 3 is parabolic in both the horizontal and vertical cross sections. The parabola in the horizontal cross section is curved outward in the positive direction on the X-axis. The parabola in the vertical cross section is curved inward in the positive direction on the X-axis. Accordingly, this plane positively diffuses light in the horizontal direction.

The segments of the reflecting area 2(2) adjacent the reflecting area 2(1) in the second and third quadrants in the y-z plane, the reflecting area 2(3) adjacent the reflecting area 2(1) in the first quadrant in the y-z plane, the small reflecting area 2(4) adjacent the circular hole 2*a* directly under the x-y plane in the fourth quadrant in the y-z plane, and the reflecting area 2(5) on the right side of the reflecting area 2(1) in the fourth quadrant in the y-z plane each have an elliptic paraboloid configuration.

Figure 5:
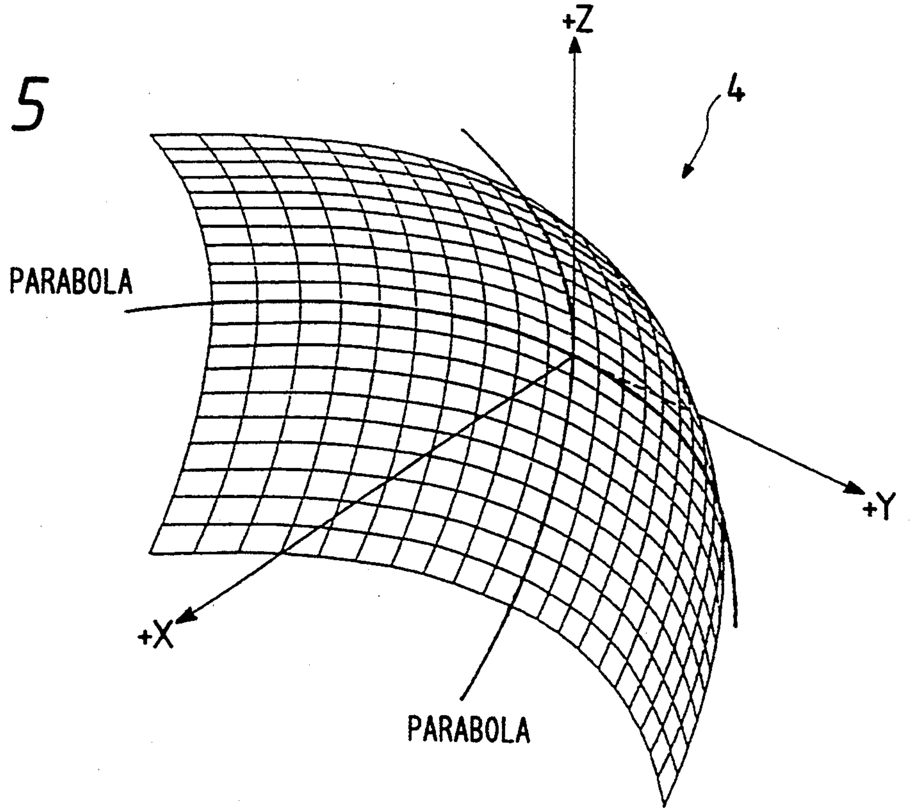
FIG. 5 is a perspective view showing an elliptic paraboloid surface.

FIG. 5 shows an elliptic paraboloid plane or surface 4 in the X-Y-Z orthogonal coordinate system defined as in FIG. 4. The horizontal and vertical cross sections of the plane are both parabolic. The parabolas of these cross sections are curved inward in the positive direction on the X-axis. The diffusion action of this plane or surface in the horizontal direction is lower than that of the hyperbolic paraboloid plane 3.

The fan-shaped reflecting area 2(6) located directly under the x-y plane in the fourth quadrant in the y-z plane contributes to the formation of a cut line in the light distribution for the passing beam. As shown in FIG. 2, the segment SEG (6) is radially extended from the origin O.

The segment SEG (6) has a paraboloid-of-revolution surface. Alternatively, it may be shaped as a two-sheet hyperbolic paraboloid.

Figure 6:
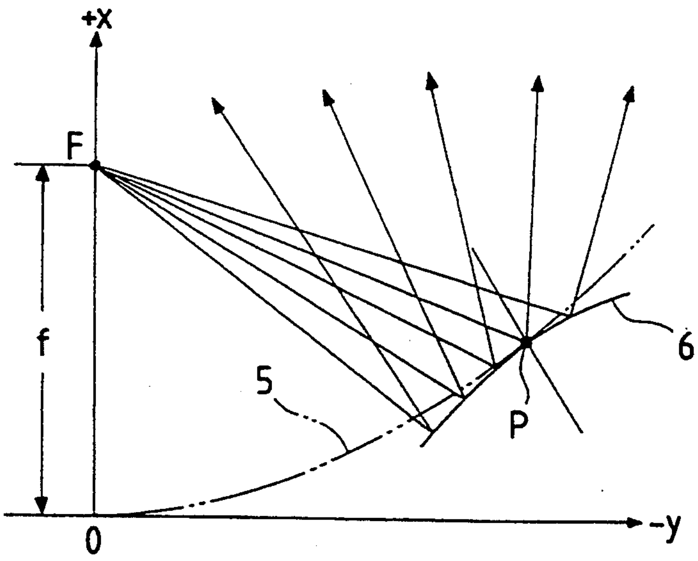
FIG. 6 is a diagram showing how the hyperbolic paraboloid reflecting segments are laid out on the reference surface.

FIG. 6 schematically shows how the segments are laid out on a phantom paraboloid-of-revolution surface as a reference surface.

Figure 7:
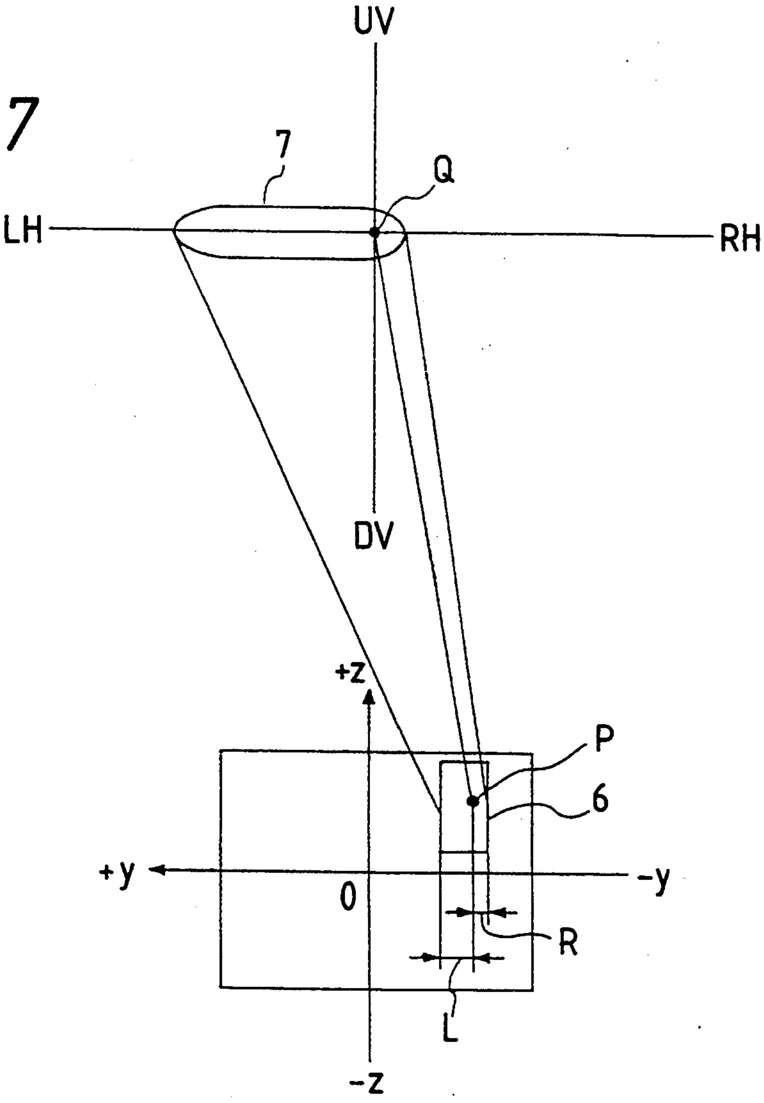
FIG. 7 is a diagram showing the relationship between a reflecting segment and its projection pattern.

In this figure showing the layout of the segments on the hyperbolic paraboloid surface, a reference point on the hyperbolic paraboloid surface is translated to a point p on a phantom parabola 5 indicative of the paraboloid of revolution of a focal point F (focal distance is denoted as f) so that the normal vectors are coincident with each other. As shown in FIG. 7, the point P is set at a position obtained by internally dividing the segment width at a ratio (L:R in the figure) so as not to position the point P at the width center of a segment 6.

In this case, if L:R=1:1, that is, the point P is see at the center of the segment width, the resulting projection pattern of the filament image by the segment is horizontally symmetrical with respect to the projection point corresponding to the point P. If the ratio of L and R is selected as desired, the expansion of the filament image in the horizontal direction can be controlled by the L/R ratio.

When the left area of the point P is larger than the right area as shown in FIG. 7, the projection pattern is greatly deviated to the left from the projection point Q corresponding to the point P, as shown, while occupying a small area on the right side of the projection point.

FIG. 7 is a diagram schematically illustrating a projection pattern 7 of the segment 6, which is formed on a screen located a sufficient distance apart from the front of the reflector 1. "LH - RH" and "UV - DV" indicate relative coordinate axes formed when translated from a reference axis on the screen, with the point Q as the origin. "LH - RH" and "UV - DV" indicate the horizontal line and the vertical line, respectively.

The above operation is applied, for every segment, to the paraboloid-of-revolution surface of nonconstant focal distance. In this case, the L/R ratio is determined for each segment.

Under the condition that the segments are continuous at the boundaries, the segments are laid out on the reference surface in successive order by designating the start positions of the segments and the end positions.

Figure 3:
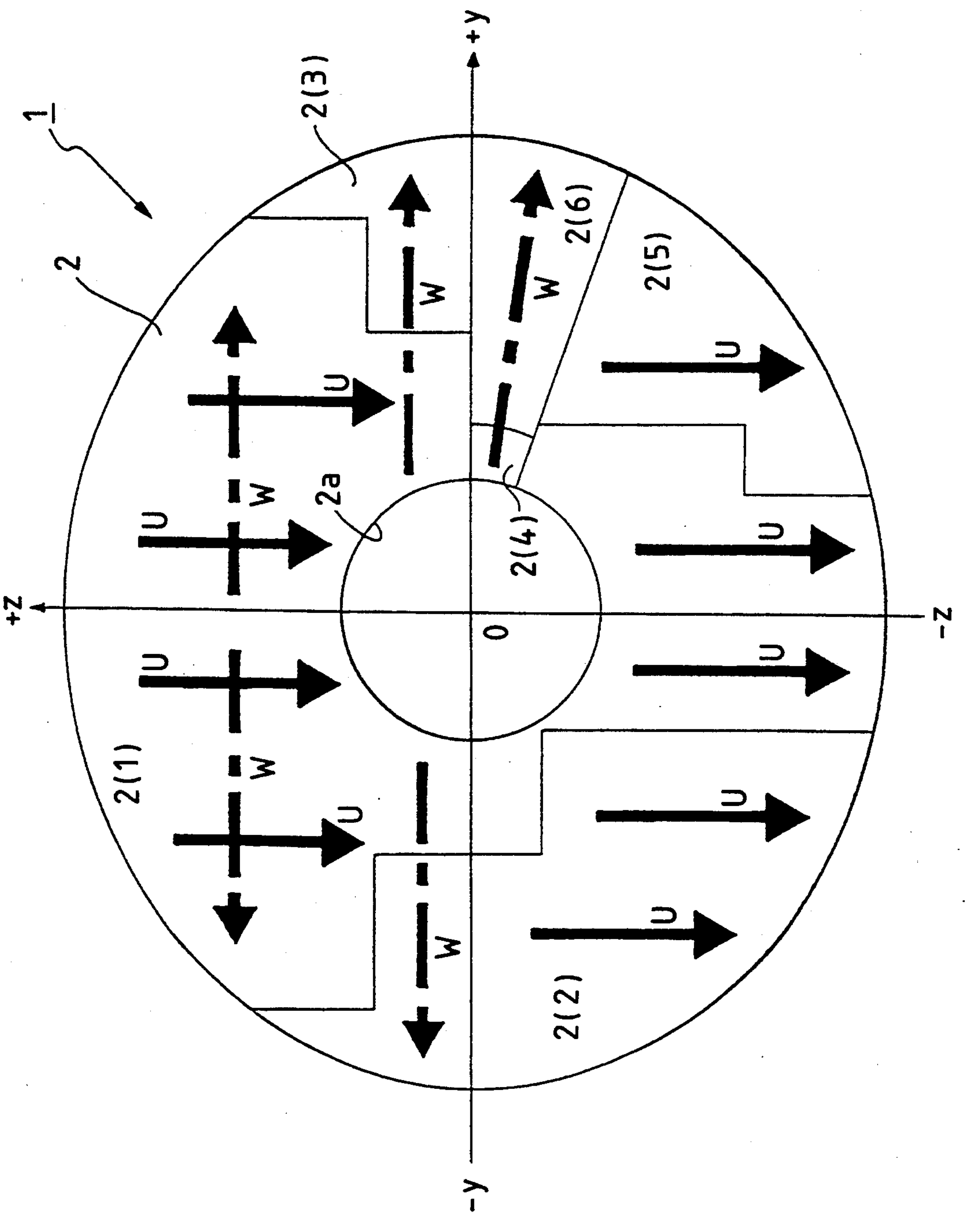
FIG. 3 is a front view schematically showing the reflector illustrating how the focal distances of a reference surface are distributed on the reflecting surface.

FIG. 3 shows how the focal distances f on the reference surface are distributed on the reflecting surface 2.

In the figure, arrows U and W which are indicated by solid lines and one-dot chain lines show in terms of vectors a state such that the focal distance f is smaller in the direction of the arrows.

As indicated by the solid-line arrow U, the focal distance f is smaller toward the upper location. As indicated by the one-dot chain line arrow W, the focal distance f becomes larger the farther the reflecting segment from the x-z plane in the horizontal direction.

Some specific examples of numerical values of the focal distances f will be given. The focal distance f indicated by the upward arrow, which is located on the right side of the z-axis in the first quadrant in the y-z plane and extends therealong, varies within the range of 22 mm to 3.5 mm (f=22 to 3.5 mm). The focal distance f indicated by the leftward arrow, which is located just above the right side of the y-axis in the first quadrant in the y-z plane and extends therealong, varies within the range of 25 mm to 25.7 mm (f=25 to 25.7 mm). The variation of the focal distance f in the vertical axis is greater than that of the focal distance u in the horizontal direction.

In this embodiment, the area of the reflecting area 2(1) under the x-y plane and the reflecting areas 2(2) and 2(5) are shaped so that the focal distances f are not varied. If required, those areas may be shaped so that the focal distance f increases as the distance from the x-z plane increases, as the area above the x-y plane.

Figure 8:
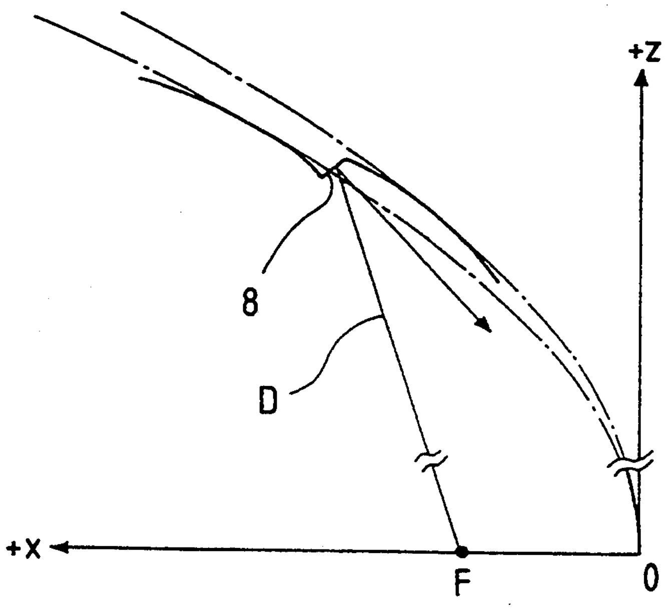
FIG. 8 is a diagram for explaining why the light reflected from a stepped part (when seen in cross section) between the adjacent reflecting segments of the reflecting surface is directed downward.

FIG. 8 schematically shows the reflecting surface 2 in vertical cross section. As the locations of the reflecting segments become higher, the focal distance f of the reference surface becomes smaller. A stepped part 8 at the boundary between the adjacent segments is formed, which is directed downward. Light D reflected by the stepped part 8 goes downward, leading to a reduction of glare.

The fact that the focal distance f of the paraboloid-of-revolution surface as the reference surface increases as the location of the reflecting segment becomes higher implies that the paraboloid-of-revolution surface is deformed toward the optical axis. From this, it is readily seen that the solid angle when the reflecting surface 2 is seen from the light source is larger than when the focal distance f is fixed.

Figure 9:
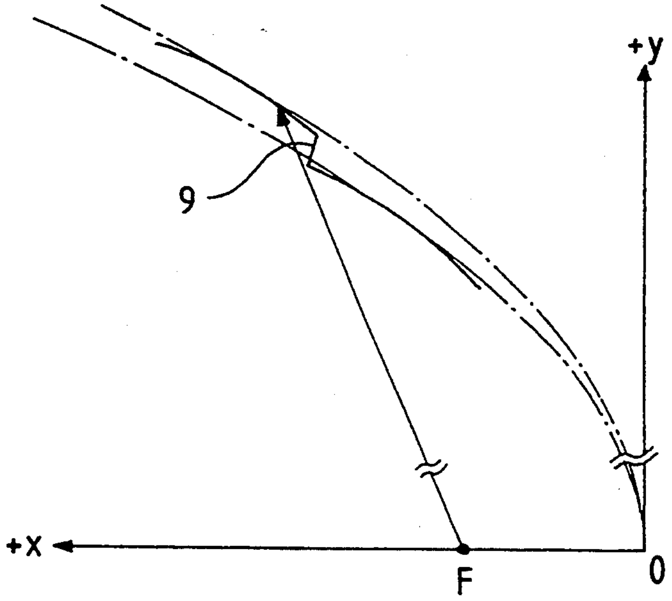
FIG. 9 is a diagram for explaining why a stepped part between the adjacent reflecting segments is located in the dead zone when seen from the light source.

FIG. 9 schematically shows the reflecting surface 2 in horizontal cross section. The focal distance f of the reference surface increases the farther the reflecting segment from the origin O. A stepped part 9 at the boundary between adjacent segments is formed, which is directed outward. When seen from the light source, the stepped part 9 is hidden by the segment. The stepped part 9 is located in a dead zone when seen from the light source.

Figure 10:
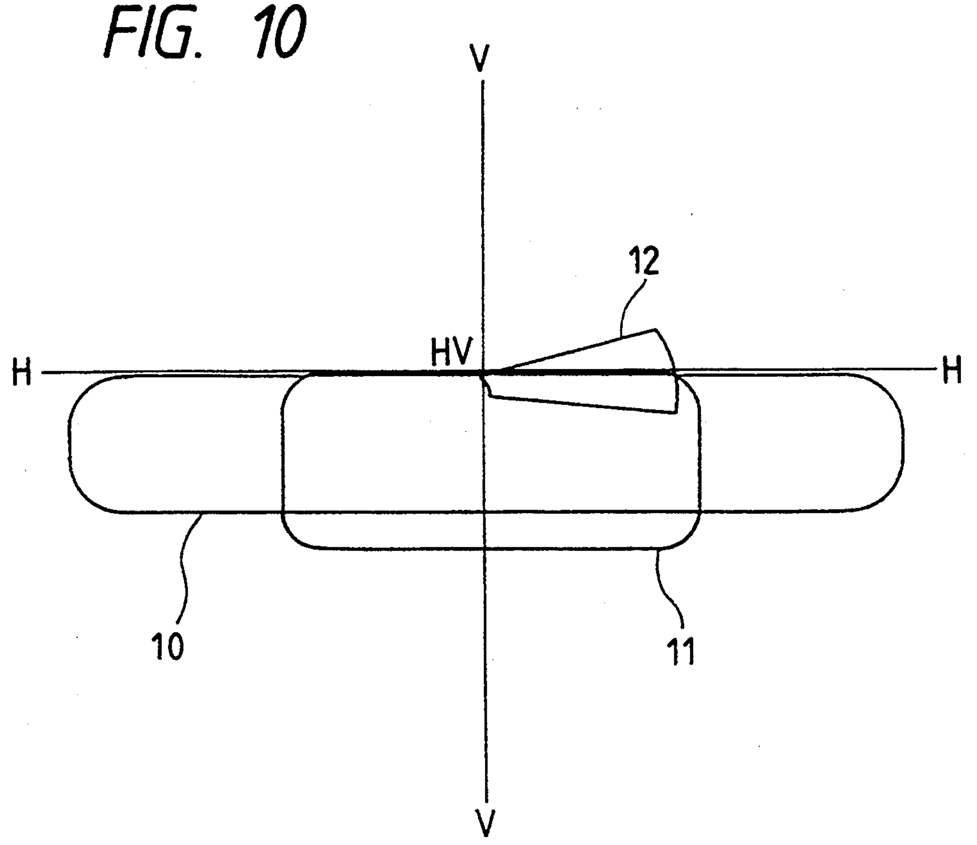
FIG. 10 is a diagram schematically showing a projection pattern formed by a passing beam from the composite pattern.
Figure 11A:
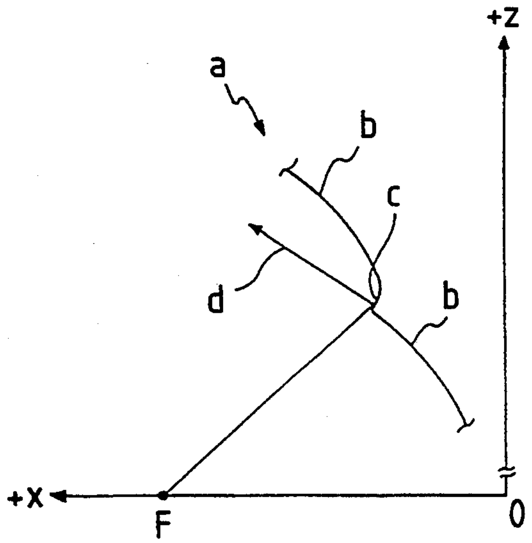
FIGS. 11(*a*) and 11(*b*) are respectively vertical and horizontal sectional views of a reflector, and are used in explaining the light distribution control segments of the reflecting surface.
Figure 11B:
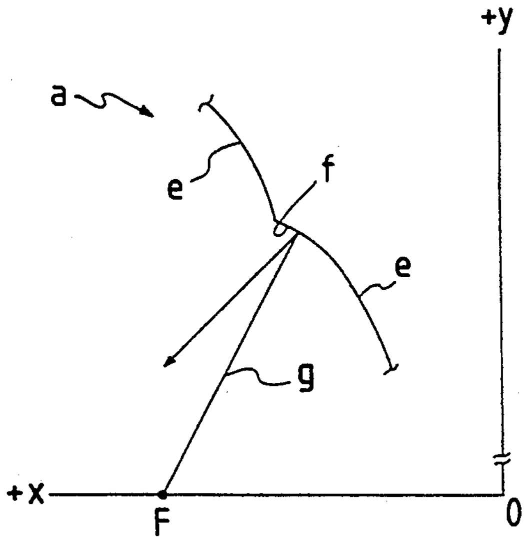

When the filament is disposed along the optical axis and the shade is disposed thereunder, the light reflected by the reflector 1 forms a projection pattern as shown in FIG. 10. In the figure, "H—H" indicates a horizontal line, "V—V", a vertical line, and a point HV indicates the intersection of the horizontal and vertical lines.

As seen, a projection pattern 10 formed by the reflecting area 2(1) is located under the horizontal line "H—H" and diffused horizontally. A composite pattern 11 formed by the reflecting areas 2(2), 2(3) and 2(4) and located under the point HV is narrower than the projection pattern 10 as viewed horizontally. This pattern contributes to the formation of the luminous-intensity center of a distribution pattern.

The projection pattern 12 by the reflecting area 2(6), which is shaped like a fan, ranges on both sides of the horizontal line H—H. This pattern contributes to the formation of a cut line tilted a given angle.

The pattern formed by the reflecting area of which the segments have the hyperbolic paraboloid surfaces contributes to horizontal diffusion in the light distribution. The pattern formed by the reflecting area of which the segments have elliptic paraboloid surfaces contributes to the formation of the luminous-intensity center of a distribution pattern.

The overall distribution pattern for the passing beam is formed by composing the patterns as mentioned above. The distribution control function of the reflecting surface 2 forms a pattern resembling a prescribed distribution pattern. The distribution control load of the outer lens is thereby lessened.

As described above, in the reflector of the present invention, the higher the location of the reflecting segment, the smaller the focal distance of the reference surface. Accordingly, a stepped part formed at the boundary between adjacent ones of the reflecting segments as viewed in the vertical direction faces downward. Light reflected at the stepped part is directed downward. As a result, glare is minimized.

Also, the farther the reflecting segment from the vertical plane including the optical axis in the horizontal direction, the greater the focal distance. A stepped part between adjacent reflecting segments as viewed in the horizontal direction is located in a dead zone when seen from the light source. The reflected light from the stepped part thus does not adversely affect the light distribution.

Since the focal distances of the reference surface are locally different, the focal distance does not uniquely determine the width of the reflector. Accordingly, the solid angle when the reflecting surface is seen from the filament may be increased. Thus, the reflector can meet the requirement for reducing the overall width of the lamp.

What is claimed is:

1. A reflector for a vehicular headlamp comprising a reflecting surface divided into a plural number of reflecting areas, and a light source for forming a passing beam positioned in such a way that a center axis of the light source lies along an optical axis of the reflecting surface, wherein:

a) each of said reflecting areas comprises an aggregation of reflecting segments;

b) each of said reflecting segments of each of said reflecting areas has a configuration of one of a hyperbolic paraboloid, an elliptic paraboloid, a two-sheet hyperbolic paraboloid and a paraboloid of revolution, all of said reflecting segments being laid out on a reference surface and cooperating to form said reflecting surface; and c) said reference surface is a paraboloid-of-revolution surface, focal distances of said reference surface being different for different ones of said reflecting segments such that the higher the location of any one of said reflecting segments, the smaller the focal distance of said reference surface, and the farther any one of said reflecting segment from a vertical plane including said optical axis in a horizontal direction, the larger said focal distance.

2. The reflector for a vehicular headlamp of claim 1, wherein said reflecting areas comprises reflecting areas exhibiting good diffusion in the horizontal direction for a light distribution pattern for said passing beam and consisting of hyperbolic paraboloid reflecting segments.

3. The reflector for a vehicular headlamp of claim 1, wherein said reflecting areas comprise reflecting areas contributing to the formation of a central part of a light distribution pattern for said passing beam and consisting of elliptic paraboloid reflecting segments.

4. The reflector for a vehicular headlamp of claim 1, wherein said reflecting areas comprise reflecting areas contributing to the formation of a cut line tapered with respect to a horizontal line in a light distribution pattern for said passing beam and consisting of two-sheet hyperbolic paraboloid reflecting segments.

5. The reflector for a vehicular headlamp of claim 1, wherein said reflecting areas comprise reflecting areas contributing to the formation of a cut line tapered with respect to a horizontal line in a light distribution pattern for said passing beam and consisting of paraboloid of revolution reflecting segments.

6. A reflector for a vehicular headlamp comprising a reflecting surface divided into a plural number of reflecting areas, and a light source for forming a passing beam positioned in such a way that a center axis of the light source lies along an optical axis of the reflecting surface, wherein:

a) each of said reflecting areas comprises an aggregation of reflecting segments;

b) each of said reflecting segments of each of said reflecting areas has a configuration of one of a hyperbolic paraboloid, an elliptic paraboloid, a two-sheet hyperbolic paraboloid and a paraboloid of revolution, all of said reflecting segments being laid out on a reference surface and cooperating to form said reflecting surface; and c) said reference surface is a paraboloid-of-revolution surface, focal distances of said reference surface being different for different ones of said reflecting segments such that the higher the location of any one of said reflecting segments, the smaller the focal distance of said reference surface, and the farther any one of said reflecting segment from a vertical plane including said optical axis in a horizontal direction, the larger said focal distance;

d) said reflecting areas comprises reflecting areas exhibiting good diffusion in the horizontal direction for a light distribution pattern for said passing beam and consisting of hyperbolic paraboloid reflecting segments;

e) said reflecting areas comprise reflecting areas contributing to the formation of a central part of a light distribution pattern for said passing beam and consisting of elliptic paraboloid reflecting segments;

f) said reflecting areas comprise reflecting areas contributing to the formation of a cut line tapered with respect to a horizontal line in a light distribution pattern for said passing beam and consisting of at least one of two-sheet hyperbolic paraboloid reflecting segments and paraboloid of revolution reflecting segments.

* * * * *